(12) United States Patent
Felch et al.

(10) Patent No.: US 9,193,613 B2
(45) Date of Patent: *Nov. 24, 2015

(54) PH CONTROL TO ENABLE HOMOGENEOUS CATALYTIC WET AIR OXIDATION

(71) Applicant: SIEMENS ENERGY, INC., Orlando, FL (US)

(72) Inventors: Chad L. Felch, Mosinee, WI (US); Bryan Kumfer, Ringle, WI (US)

(73) Assignee: SIEMENS ENERGY, INC., Orlando, FL (US)

( * ) Notice: Subject to any disclaimer, the term of this patent is extended or adjusted under 35 U.S.C. 154(b) by 287 days.

This patent is subject to a terminal disclaimer.

(21) Appl. No.: 13/840,114

(22) Filed: Mar. 15, 2013

(65) Prior Publication Data

US 2013/0206705 A1 Aug. 15, 2013

Related U.S. Application Data

(63) Continuation-in-part of application No. 13/081,259, filed on Apr. 6, 2011, now Pat. No. 8,460,557, which is a continuation of application No. 11/542,675, filed on Oct. 3, 2006, now Pat. No. 7,993,588.

(51) Int. Cl.
*C02F 1/74* (2006.01)
*C02F 1/72* (2006.01)
(Continued)

(52) U.S. Cl.
CPC ............... *C02F 1/725* (2013.01); *C02F 11/08* (2013.01); *C02F 1/52* (2013.01); *C02F 1/66* (2013.01);
(Continued)

(58) Field of Classification Search
CPC ........ C02F 11/08; C02F 1/66; C02F 2209/06; C02F 1/725; C02F 2209/005; C02F 1/727; C02F 1/74
USPC .............. 210/42, 50, 59, 63, 180, 195.1, 197, 210/205, 252, 258, 710, 721, 739, 749, 743, 210/758, 759, 760, 762, 763, 766, 774, 908, 210/917, 928; 422/108, 116, 184.1, 188, 422/189, 205, 226, 227, 228, 198, 234, 235, 422/242; 252/420; 568/959; 423/37
See application file for complete search history.

(56) References Cited

U.S. PATENT DOCUMENTS 3,607,004 A 9/1971 Deschamps et al.
3,607,925 A * 9/1971 Boichard et al. .............. 562/548
(Continued)

FOREIGN PATENT DOCUMENTS

CN 1306943 A 8/2001
EP 0368834 A1 5/1990
(Continued)

OTHER PUBLICATIONS

Mehra, A., et al., "Adsorption of Hydrogen Sulfide in Aqueous Solutions of Iodides Containing Dissolved Iodine: Enhancements in Rates Due to Precipitated Sulfer," Chemical Engineering Science, vol. 43, No. 5, pp. 1071-1081, 1988, pp. 1071-1081.

(Continued)

*Primary Examiner* — Walter D Griffin
*Assistant Examiner* — Cameron J Allen

(57) ABSTRACT

A system and method for the treatment of process streams is provided. A catalyst mediates a wet oxidation process at elevated temperatures and pressures for treating at least one undesirable constituent in an aqueous mixture. A catalyst may be selected for its solubility at a detected pH level of the aqueous mixture. Alternatively, a pH level of the aqueous mixture may be adjusted to solubilize a selected catalyst and/or maintain the selected catalyst in a soluble form. A controller in communication with a pH sensor may be configured to generate a control signal to adjust the pH level of the aqueous mixture in response to the pH sensor registering a pH level outside a predetermined pH solubility range for a selected catalyst.

20 Claims, 4 Drawing Sheets

(51) Int. Cl.
*C02F 11/08* (2006.01)
*C02F 1/66* (2006.01)
*C02F 1/52* (2006.01)

(52) U.S. Cl.
CPC . *C02F 1/727* (2013.01); *C02F 1/74* (2013.01); *C02F 2209/005* (2013.01); *C02F 2209/06* (2013.01)

(56) References Cited

U.S. PATENT DOCUMENTS

| | | | |
|---|---|---|---|
| 3,716,620 | A | 2/1973 | Deschamps et al. |
| 3,912,626 | A * | 10/1975 | Ely et al. ............ 210/710 |
| 4,066,739 | A | 1/1978 | Chen |
| 4,094,780 | A | 6/1978 | Iwai et al. |
| 4,094,962 | A | 6/1978 | Cocuzza et al. |
| 4,141,828 | A | 2/1979 | Okada et al. |
| 4,214,982 | A | 7/1980 | Pfalzer |
| 4,220,505 | A | 9/1980 | Deem |
| 4,234,423 | A | 11/1980 | Moore et al. |
| 4,265,747 | A | 5/1981 | Copa et al. |
| 4,294,706 | A | 10/1981 | Kakihara et al. |
| 4,294,720 | A | 10/1981 | Visser et al. |
| 4,347,226 | A | 8/1982 | Audeh et al. |
| 4,350,599 | A | 9/1982 | Chowdhury |
| 4,626,354 | A | 12/1986 | Hoffman et al. |
| 4,749,492 | A | 6/1988 | Berrigan, Jr. et al. |
| 4,778,598 | A | 10/1988 | Hoffman et al. |
| 4,810,386 | A | 3/1989 | Copa et al. |
| 4,897,196 | A | 1/1990 | Copa et al. |
| 4,970,005 | A | 11/1990 | Schuchardt |
| 5,019,227 | A | 5/1991 | White et al. |
| 5,080,792 | A | 1/1992 | McGovern et al. |
| 5,082,571 | A | 1/1992 | Beula et al. |
| 5,145,587 | A | 9/1992 | Ishii et al. |
| 5,230,810 | A | 7/1993 | Clark et al. |
| 5,240,619 | A | 8/1993 | Copa et al. |
| 5,244,576 | A | 9/1993 | DeRoeck et al. |
| 5,246,597 | A | 9/1993 | Jenson et al. |
| 5,268,104 | A | 12/1993 | Masoomain |
| 5,298,174 | A | 3/1994 | Momont et al. |
| 5,358,646 | A | 10/1994 | Gloyna et al. |
| 5,368,726 | A | 11/1994 | Masoomian |
| 5,407,584 | A | 4/1995 | Broussard, Sr. |
| 5,543,057 | A | 8/1996 | Whiting et al. |
| 5,620,606 | A * | 4/1997 | McBrayer et al. ......... 210/696 |
| 5,641,413 | A | 6/1997 | Momont et al. |
| 5,707,530 | A | 1/1998 | Broussard, Jr. |
| 5,720,889 | A | 2/1998 | McBrayer, Jr. et al. |
| 5,885,422 | A | 3/1999 | Kurukchi et al. |
| 5,891,346 | A | 4/1999 | Huntley |
| 5,948,275 | A | 9/1999 | Djafer et al. |
| 6,110,385 | A | 8/2000 | Copa et al. |
| 6,210,583 | B1 | 4/2001 | Kurukchi et al. |
| 6,332,986 | B1 | 12/2001 | Johnson et al. |
| 6,375,907 | B1 | 4/2002 | Gallup |
| 6,395,188 | B1 | 5/2002 | Burdeniuc et al. |
| 6,398,959 | B1 | 6/2002 | Teran et al. |
| 6,417,133 | B1 | 7/2002 | Ebner et al. |
| 6,444,130 | B1 | 9/2002 | Manganaro et al. |
| 6,576,144 | B1 | 6/2003 | Vineyard |
| 7,005,076 | B2 | 2/2006 | Chowdhury et al. |
| 7,172,701 | B2 | 2/2007 | Gaid et al. |
| 7,993,588 | B2 | 8/2011 | Felch et al. |
| 8,501,149 | B2 | 8/2013 | Felch et al. |
| 2004/0245188 | A1 | 12/2004 | Chowdhury et al. |
| 2005/0171390 | A1 * | 8/2005 | Felch et al. ............ 568/959 |
| 2006/0060541 | A1 | 3/2006 | Abazajian |
| 2008/0035583 | A1 | 2/2008 | Lopez Martinez et al. |
| 2008/0078724 | A1 | 4/2008 | Felch et al. |
| 2008/0078725 | A1 | 4/2008 | Felch et al. |
| 2010/0126937 | A1 | 5/2010 | Felch |
| 2011/0210079 | A1 | 9/2011 | Felch et al. |

FOREIGN PATENT DOCUMENTS

| | | |
|---|---|---|
| EP | 1457268 A2 | 9/2004 |
| EP | 1647529 A1 | 4/2006 |
| FR | 2064785 A6 | 7/1971 |
| GB | 2423490 A | 8/2006 |
| JP | 61257291 A | 11/1986 |
| SU | 618922 A1 | 8/1981 |
| SU | 912232 A1 | 3/1982 |
| WO | 03045525 A1 | 6/2003 |
| WO | 2006010218 A1 | 2/2006 |
| WO | 2007069238 A1 | 6/2007 |
| WO | 2008042089 A2 | 4/2008 |

OTHER PUBLICATIONS

Wubs, "Absorption of hydrogen sulfide in aqueous solutions of iodine—a critical review," Chemical Engineering Science, vol. 46, No. 2, 1991, pp. 703-706.

Zuh et al., "Application of catalytic wet air oxidation for the treatment of H-acid manufacturing process wastewater," Water Research, Elsevier, Amsterdam, vol. 36, No. 8, pp. 1947-1954; ISSN: 0043-1354; DOI: 10. 1016/ S0043-1354 (01)00419-5; XP004352501.

Yang et al., "Catalytic wet air oxidation of phenol over Ce02-Ti02 catalyst in the batch reactor and the packed-bed reactor," Journal of Hazardous Materials, XP022587244, Sep. 29, 2007, pp. 1248-1253, vol. 153, No. 3, Elsevier, Amsterdam, NL.

De Leitenburg et al., "Wet oxidation of acetic acid catalyzed by doped ceria," Applied Catalysis B; Environmental, XP022214784, Dec. 27, 1996, pp. L29-L35, vol. 11, No. 1, Elsevier, Amsterdam, NL.

Manganese (Mn) Atomic Mass—[Chemical Elements.com; accessed Aug. 2013; 2 pages].

Cerium (Ce) Atomic Mass [Chemical Elements.com; accessed Aug. 2013; 2 pages].

* cited by examiner

PH CONTROL TO ENABLE HOMOGENEOUS CATALYTIC WET AIR OXIDATION

CROSS REFERENCE TO RELATED APPLICATIONS

This application is a continuation-in-part application of U.S. application Ser. No. 13/081,259 filed on Apr. 6, 2011 titled CATALYTIC WET OXIDATION SYSTEMS AND METHODS, now U.S. Pat. No. 8,460,557, which is a continuation application of U.S. application Ser. No. 11/542,675 filed on Oct. 3, 2006, titled CATALYTIC WET OXIDATION SYSTEMS AND METHODS, now U.S. Pat. No. 7,993,588, each of which is herein incorporated by reference in their entirety for all purposes.

BACKGROUND OF THE INVENTION

1. Field of the Invention

The present invention relates generally to the treatment of process streams and, more particularly, to catalytic wet oxidation systems and methods for treatment of undesirable constituents therein.

2. Description of Related Art

Wet oxidation is a well-known technology for treating process streams, and is widely used, for example, to destroy pollutants in wastewater. The method involves aqueous phase oxidation of undesirable constituents by an oxidizing agent, generally molecular oxygen from an oxygen-containing gas, at elevated temperatures and pressures. The process can convert organic contaminants to carbon dioxide, water and biodegradable short chain organic acids, such as acetic acid. Inorganic constituents including sulfides, mercaptides and cyanides can also be oxidized. As an alternative to incineration, wet oxidation may be used in a wide variety of applications to treat process streams for subsequent discharge, in-process recycle, or as a pretreatment step to supply a conventional biological treatment plant for polishing. Catalytic wet oxidation has emerged as an effective enhancement to traditional non-catalytic wet oxidation. Catalytic wet oxidation processes generally allow for greater destruction to be achieved at a lower temperature and pressure, and therefore a lower capital cost. An aqueous stream to be treated is mixed with an oxidizing agent and contacted with a catalyst at elevated temperatures and pressures. Heterogeneous catalysts typically reside on a bed over which the aqueous mixture is passed, or in the form of solid particulate which is blended with the aqueous mixture prior to oxidation. The catalyst may be filtered out of the oxidation effluent downstream of the wet oxidation unit for reuse.

BRIEF SUMMARY OF THE INVENTION

In accordance with one or more embodiments, a catalytic wet oxidation process is provided. The process may comprise providing an aqueous mixture containing at least one undesirable constituent to be treated, detecting a pH level of the aqueous mixture containing at least one undesirable constituent to be treated, selecting a catalyst soluble at the detected pH level of the aqueous mixture, wherein the catalyst and the detected pH level are selected from the group consisting of: copper at a pH level of about 4 or lower, copper at a pH level above about 13, vanadium at a pH level above about 4.5, and iron at a pH level below about 4, contacting the aqueous mixture containing at least one undesirable constituent to be treated with the selected catalyst soluble at the detected pH level and an oxidizing agent at an elevated temperature and a superatmospheric pressure to treat the at least one undesirable constituent, monitoring the pH level of the aqueous mixture, and maintaining the pH level of the aqueous mixture to maintain the catalyst in a soluble form during the catalytic wet oxidation process.

In accordance with one or more embodiments, the catalytic wet oxidation process comprises providing an aqueous mixture containing at least one undesirable constituent to be treated, selecting a catalyst, detecting a pH level of the aqueous mixture containing at least one undesirable constituent to be treated, adjusting the pH level of the aqueous mixture containing at least one undesirable constituent to be treated to solubilize the selected catalyst, the pH level selected from the group consisting of: about 4 or lower when the catalyst comprises copper, above about 13 when the catalyst comprises copper, above about 4.5 when the catalyst comprises vanadium, and below about 4 when the catalyst comprises iron, contacting the aqueous mixture with the selected catalyst and an oxidizing agent at an elevated temperature and a superatmospheric pressure to treat the at least one undesirable constituent, monitoring the pH level of the aqueous mixture, and maintaining the pH level of the aqueous mixture to maintain the selected catalyst in a soluble form during the catalytic wet oxidation process. In one or more embodiments, selecting the catalyst comprises selecting a catalyst present in the aqueous mixture. According to certain embodiments, adjusting the pH level comprises utilizing an alkali metal hydroxide.

According to one or more embodiments, contacting the aqueous mixture with the selected catalyst occurs prior to heating. In various embodiments, contacting the aqueous mixture with the selected catalyst occurs prior to pressurization. In some embodiments, the aqueous mixture is oxidized in a continuous process. In at least one aspect, the method further comprises replenishing the catalyst. In some aspects, contacting the aqueous mixture with an oxidizing agent comprises contacting the aqueous mixture with an oxygen-containing gas. In certain aspects, the method further comprises recovering the catalyst. According to some aspects, recovering the catalyst involves precipitating the catalyst. In various embodiments, the aqueous mixture is oxidized for a period of time sufficient to treat the at least one undesirable constituent. In certain embodiments, the superatmospheric pressure is from about 30 atmospheres to about 275 atmospheres. In accordance with some aspects, the elevated temperature is from about 240° C. to about the critical temperature of water. In other aspects, the elevated temperature is above the critical temperature of water.

BRIEF DESCRIPTION OF THE DRAWINGS

The accompanying drawings are not intended to be drawn to scale. In the drawings, each identical or nearly identical component that is illustrated in various figures is represented by like numeral. For purposes of clarity, not every component may be labeled in every drawing. Preferred, non-limiting embodiments of the present invention will be described with reference to the accompanying drawings, in which.

DETAILED DESCRIPTION OF THE INVENTION

Figure 1:
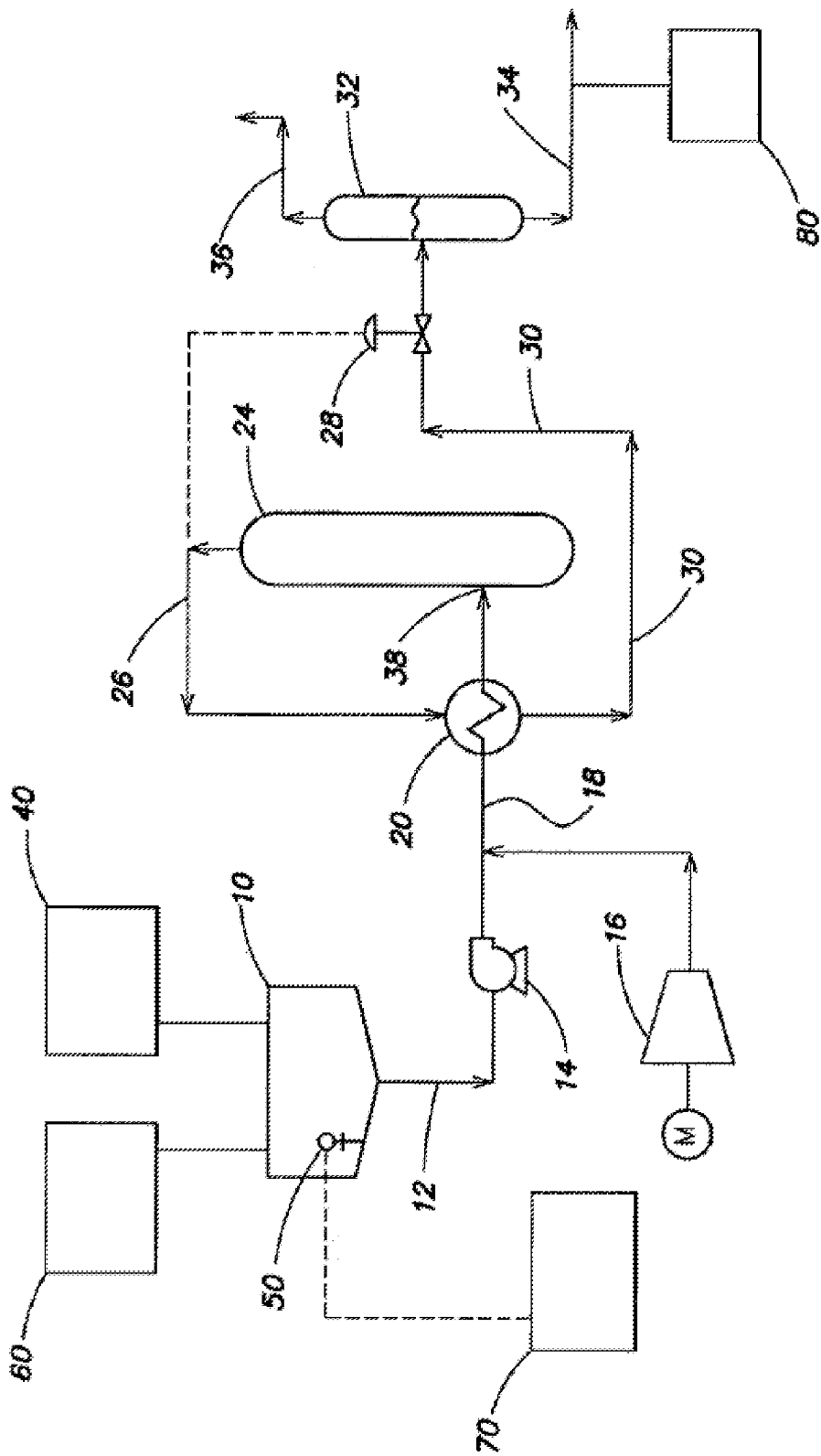
FIG. 1 is a system diagram in accordance with one embodiment of the wet oxidation system of the present invention.

This invention is not limited in its application to the details of construction and the arrangement of components as set forth in the following description or illustrated in the drawings. The invention is capable of embodiments and of being practiced or carried out in various ways beyond those exemplarily presented herein.

In accordance with one or more embodiments, the invention relates to one or more systems and methods for treating process streams. In typical operation, the disclosed systems may receive process streams from community, industrial or residential sources. For example, in embodiments in which the system is treating wastewater, the process stream may be delivered from a municipal wastewater sludge or other large-scale sewage system. Process streams may also originate, for example, from food processing plants, chemical processing facilities, gasification projects, or pulp and paper plants. The process stream may be moved through the system by an operation upstream or downstream of the system.

As used herein, the term "process stream" refers to an aqueous mixture deliverable to the system for treatment. After treatment, the process stream may be returned to an upstream process or may exit the system as waste. The aqueous mixture typically includes at least one undesirable constituent capable of being oxidized. The undesirable constituent may be any material or compound targeted to be removed from the aqueous mixture, such as for public health, process design and/or aesthetic considerations. In some embodiments, the undesirable constituents capable of being oxidized are organic compounds. Certain inorganic constituents, for example, sulfides, mercaptides and cyanides can also be oxidized. A source of an aqueous mixture to be treated by the system, such as a slurry, may take the form of direct piping from a plant or holding vessel.

In accordance with one or more embodiments of the present invention, it is desirable to disrupt one or more specific chemical bonds in the undesirable constituent or degradation product(s) thereof. An oxidation reaction is one destruction technique, capable of converting oxidizable organic contaminants to carbon dioxide, water and biodegradable short chain organic acids, such as acetic acid. One aspect of the present invention involves systems and methods for oxidative treatment of aqueous mixtures containing one or more undesirable constituents.

In one embodiment, an aqueous mixture including at least one undesirable constituent is wet oxidized. The aqueous mixture is oxidized with an oxidizing agent at an elevated temperature and superatmospheric pressure for a duration sufficient to treat the at least one undesirable constituent. The oxidation reaction may substantially destroy the integrity of one or more chemical bonds in the undesirable constituent. As used herein, the phrase "substantially destroy" is defined as at least about 95% destruction. The process of the present invention is generally applicable to the treatment of any undesirable constituent capable of being oxidized.

The disclosed wet oxidation processes may be performed in any known batch or continuous wet oxidation unit suitable for the compounds to be oxidized. Typically, aqueous phase oxidation is performed in a continuous flow wet oxidation system, as exemplarily shown in FIG. 1. Any oxidizing agent may be used. The oxidant is usually an oxygen-containing gas, such as air, oxygen-enriched air, or essentially pure oxygen. As used herein, the phrase "oxygen-enriched air" is defined as air having an oxygen content greater than about 21%.

In typical operation, and with reference to FIG. 1, an aqueous mixture from a source, shown as storage tank 10, flows through a conduit 12 to a high pressure pump 14 which pressurizes the aqueous mixture. The aqueous mixture is mixed with a pressurized oxygen-containing gas, supplied by a compressor 16, within a conduit 18. The aqueous mixture flows through a heat exchanger 20 where it is heated to a temperature which initiates oxidation. The heated feed mixture then enters a reactor vessel 24 at inlet 38. The wet oxidation reactions are generally exothermic and the heat of reaction generated in the reactor may further raise the temperature of the mixture to a desired value. The bulk of the oxidation reaction occurs within reactor vessel 24 which provides a residence time sufficient to achieve the desired degree of oxidation. The oxidized aqueous mixture and oxygen depleted gas mixture then exit the reactor through a conduit 26 controlled by a pressure control valve 28. The hot oxidized effluent traverses the heat exchanger 20 where it is cooled against incoming raw aqueous mixture and gas mixture. The cooled effluent mixture flows through a conduit 30 to a separator vessel 32 where liquid and gases are separated. The liquid effluent exits the separator vessel 32 through a lower conduit 34 while off gases are vented through an upper conduit 36. Treatment of the off gas may be required in a downstream off gas treatment unit depending on its composition and the requirements for discharge to the atmosphere. The wet oxidized effluent may typically be discharged into a biological treatment plant for polishing. The effluent may also be recycled for further processing by the wet oxidation system.

Sufficient oxygen-containing gas is typically supplied to the system to maintain residual oxygen in the wet oxidation system off gas, and the superatmospheric gas pressure is typically sufficient to maintain water in the liquid phase at the selected oxidation temperature. For example, the minimum system pressure at 240° C. is 33 atmospheres, the minimum pressure at 280° C. is 64 atmospheres, and the minimum pressure at 373° C. is 215 atmospheres. In one embodiment, the aqueous mixture is oxidized at a pressure of about 30 atmospheres to about 275 atmospheres. The wet oxidation process may be operated at an elevated temperature below 374° C., the critical temperature of water. In some embodiments, the wet oxidation process may be operated at a supercritical elevated temperature. The retention time for the aqueous mixture within the reaction chamber should be generally sufficient to achieve the desired degree of oxidation. In some embodiments, the retention time is above about one hour and up to about eight hours. In at least one embodiment, the retention time is at least about 15 minutes and up to about 6 hours. In one embodiment, the aqueous mixture is oxidized for about 15 minutes to about 4 hours. In another embodiment, the aqueous mixture is oxidized for about 30 minutes to about 3 hours.

According to one or more embodiments, the wet oxidation process is a catalytic wet oxidation process. The oxidation reaction may be mediated by a catalyst. The aqueous mixture containing at least one undesirable constituent to be treated is generally contacted with a catalyst and an oxidizing agent at an elevated temperature and superatmospheric pressure. An effective amount of catalyst may be generally sufficient to increase reaction rates and/or improve the overall destruction removal efficiency of the system, including enhanced reduction of chemical oxygen demand (COD) and/or total organic carbon (TOC). The catalyst may also serve to lower the overall energy requirements of the wet oxidation system.

In at least one embodiment, the catalyst may be any transition metal of groups V, VI, VII and VIII of the Periodic Table. In one or more embodiments, for example, the catalyst may be V, Cr, Mn, Fe, Co, Ni, Cu, Zn, Mo, Ag, or alloys or mixtures thereof. The transition metal may be elemental or present in a compound, such as a metal salt. In some embodiments, the transition metal catalyst is vanadium. In other embodiments, the transition metal catalyst is iron. In yet other embodiments, the transition metal catalyst is copper.

A catalyst may be added to the aqueous mixture at any point in the wet oxidation system. The catalyst may be mixed with the aqueous mixture. In one embodiment, the catalyst may be added to the source of the aqueous mixture feeding the wet oxidation unit as illustrated in FIG. 1 in which catalyst source 40 is fluidly connected to storage tank 10. In some embodiments, the catalyst may be directly added to the wet oxidation unit. In other embodiments, the catalyst may also be supplied to the aqueous mixture prior to heating and/or pressurization.

In yet other embodiments, the catalyst may already be present in the process stream to be treated. The aqueous mixture supplied to the oxidation unit may contain a catalytic material. For example, transition metals may be present in a waste stream to be treated by the catalytic wet oxidation system. Aqueous slurries, such as those containing volatile organic carbons, may contain metals capable of acting as a catalyst. For example, the aqueous mixture may be a slurry of gasification byproducts.

According to one or more embodiments, the catalyst may be soluble in the aqueous mixture to enhance the wet oxidation process. As used herein, the term "soluble," when used in reference to a catalyst, means that the catalyst is completely dissolved or the amount of dissolved catalyst is catalytically sufficient to cause or accelerate a reaction for performing a desired process as described in the methods and systems disclosed herein. In general, characteristics of the aqueous mixture may impact the solubility of a catalyst in the aqueous mixture. For example, a pH level of the aqueous mixture to be treated may affect the solubility of a particular catalyst in the aqueous mixture.

In some embodiments, a catalyst may be selected based on a characteristic of the aqueous mixture. As illustrated in FIG. 1, the wet oxidation system may include a sensor 50, configured to detect a characteristic of the aqueous mixture to be treated. In some embodiments, sensor 50 may be a pH sensor configured to detect a pH level of the aqueous mixture, and a catalyst for the wet oxidation process may be selected based on a detected pH level of the aqueous mixture.

The relationship between solubility and pH level for various catalysts is generally known by those skilled in the art. Potential-pH equilibrium diagrams have been constructed for various catalyst-water systems and are readily available to those skilled in the art familiar with how to reference them. For example, reproductions of what are commonly referred to as Pourbaix diagrams available from Pourbaix, M. M., The Atlas of Electrochemical Equilibria in Aqueous Solutions, National Association of Corrosion Engineers: Texas 1974, are presented in FIGS. 2-4 for copper, vanadium and iron, respectively.

Figure 3:
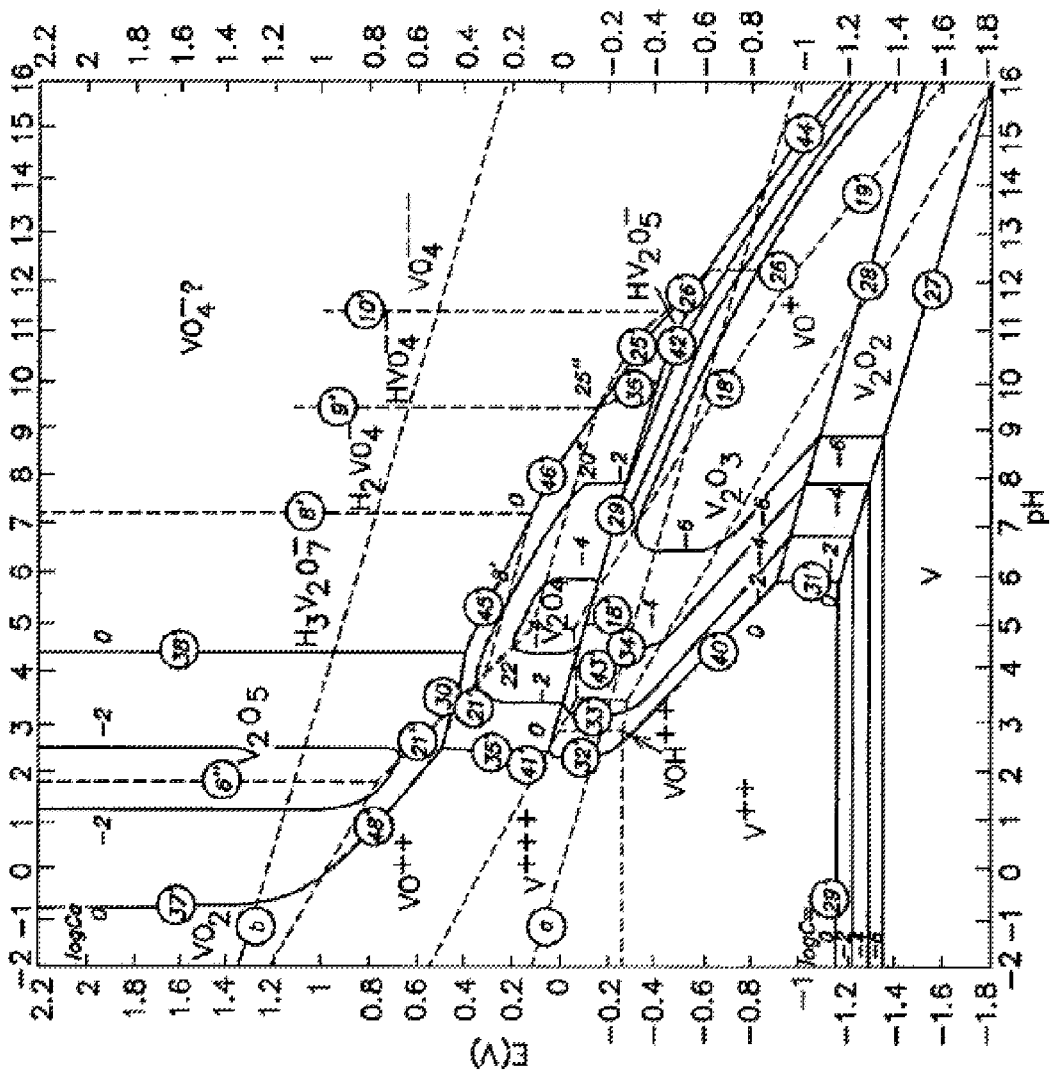
Figure 4:
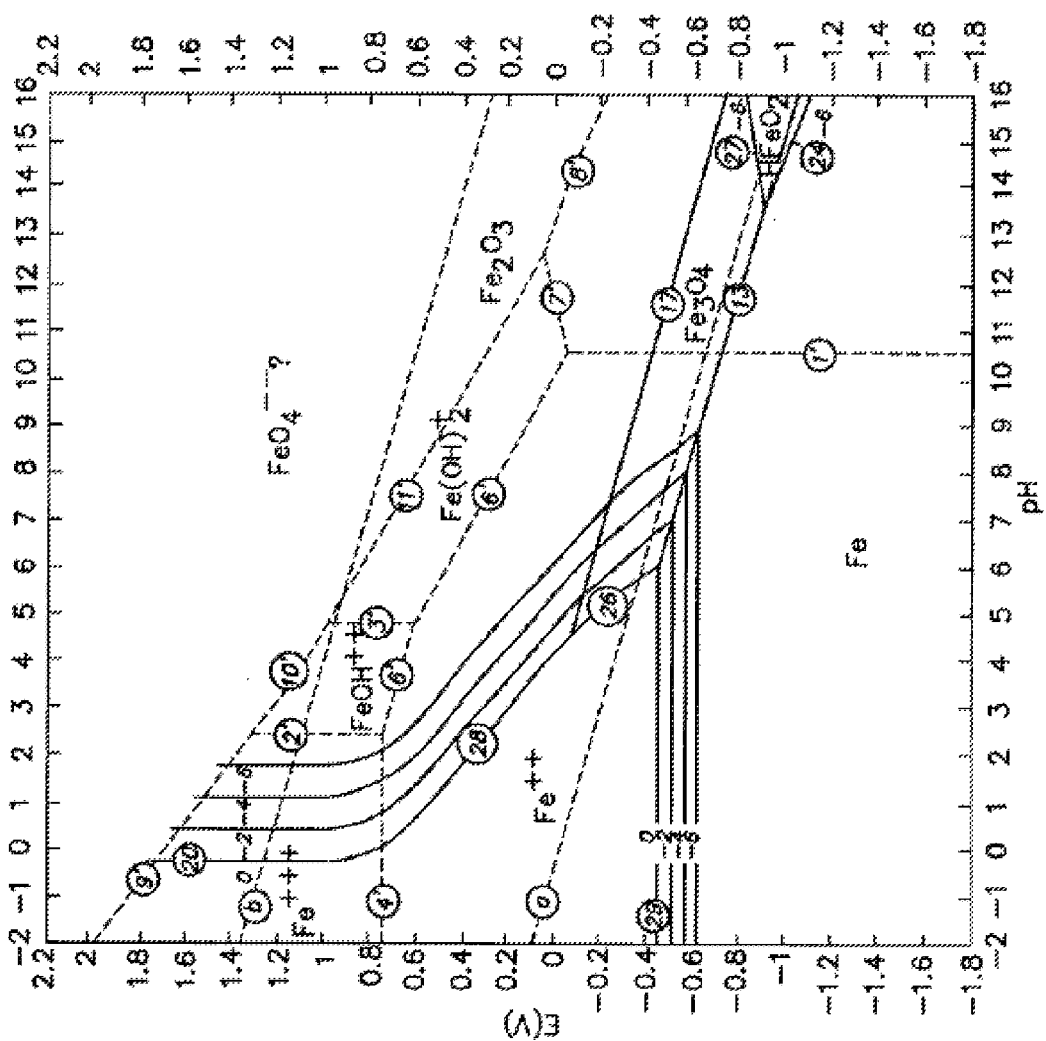

In accordance with one or more embodiments, a catalyst soluble at the detected pH level may be selected to enhance the wet oxidation process. Thus, with reference to FIG. 2, if the pH level of the aqueous mixture detected by pH sensor 50 is about 4 or lower or above about 13, a catalyst comprising copper may be selected for catalyst source 40 in accordance with one or more embodiments. Likewise, with reference to FIG. 3, a catalyst comprising vanadium may be selected when the detected pH level is above about 4.5. With reference to FIG. 4, a catalyst comprising iron may be selected when the detected pH level is below about 4. Other catalysts beyond those exemplarily presented herein may be utilized.

In other embodiments, a catalyst may be selected and one or more characteristics of the aqueous mixture may be manipulated to promote the presence of the selected catalyst in a soluble form to enhance the wet oxidation process. For example, a pH level of the aqueous mixture may be detected by sensor 50 and adjusted to solubilize the selected catalyst in the aqueous mixture. A pH adjuster may be added to the aqueous mixture at any point within the wet oxidation system but is preferably added such that the catalyst is soluble within the aqueous mixture during the oxidation reaction. In some embodiments, a source of pH adjuster 60 may be fluidly connected to the source of the aqueous mixture 10 as illustrated in FIG. 1. The source of pH adjuster 60 may generally include any material or compound capable of adjusting the pH level of the aqueous mixture to a desired value or range, such as an acid or base. For example, an alkali metal hydroxide may be utilized to adjust the pH level of the aqueous mixture. In one embodiment, ammonia may be used to solubilize the catalyst.

Figure 2:
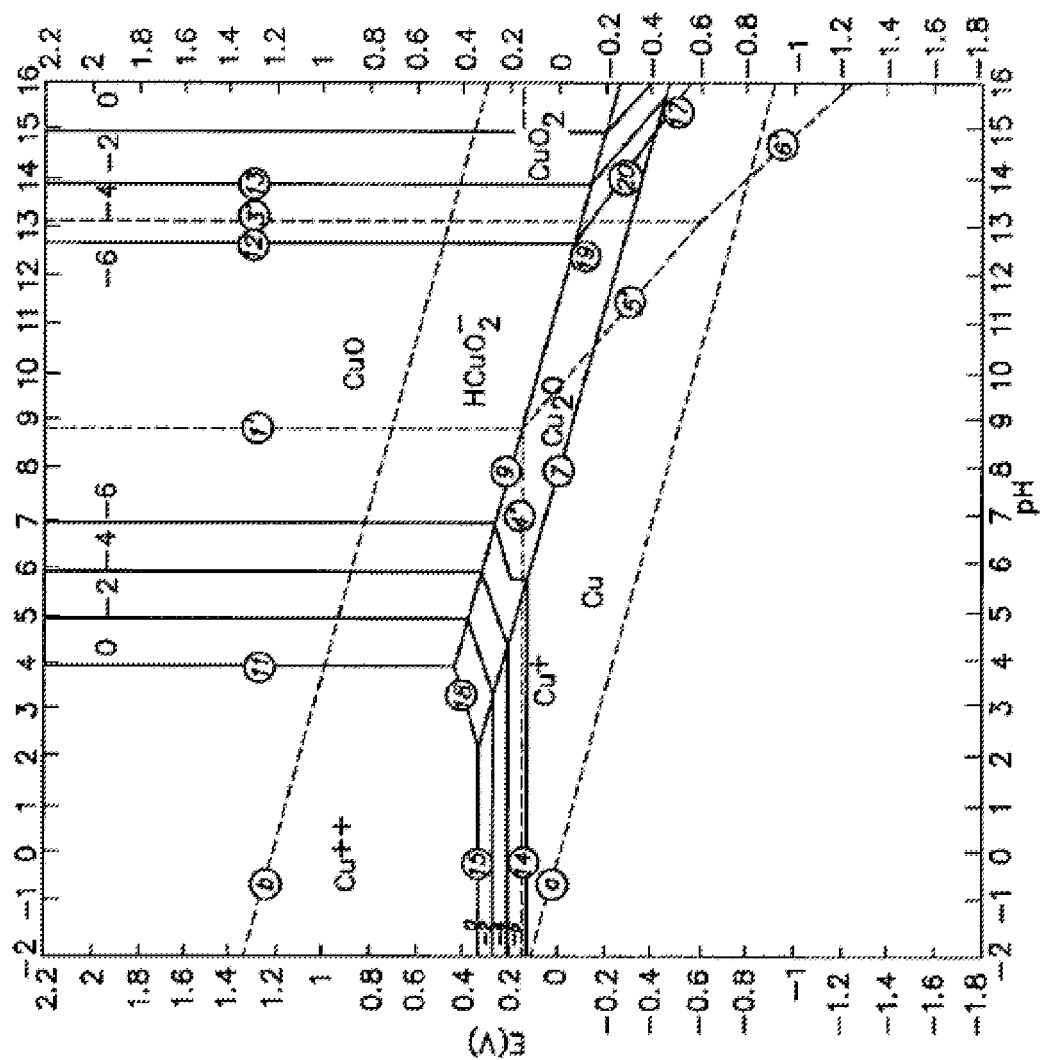
FIGS. 2-4 are Pourbaix diagrams referenced herein for copper, vanadium, and iron, respectively.

Again, the relationship between solubility and pH level for various catalysts is generally known by those skilled in the art. As discussed above, Pourbaix diagrams may provide information for determining a desired pH range in which a selected catalyst would be soluble. With reference to FIG. 2, the pH level of the aqueous mixture may be adjusted to about 4 or lower or above about 13 when the selected catalyst comprises copper. Likewise, with reference to FIG. 3, the pH level of the aqueous mixture may be adjusted to above about 4.5 when the selected catalyst comprises vanadium. When a catalyst comprising iron is selected, the pH level of the aqueous mixture may be adjusted to a level below about 4 with reference to FIG. 4.

In some embodiments, the wet oxidation system may include a controller 70 for adjusting or regulating at least one operating parameter of the system or a component of the system, such as, but not limited to, actuating valves and pumps. Controller 70 may be in electronic communication with sensor 50 as illustrated in FIG. 1. Controller 70 may be generally configured to generate a control signal to adjust the pH level of the aqueous mixture in response to the pH sensor 50 registering a pH level outside a predetermined pH solubility range for the selected catalyst. For example, controller 70 may provide a control signal to one or more valves associated with pH adjuster source 60 to add pH adjuster to aqueous mixture source 10.

The controller 70 is typically a microprocessor-based device, such as a programmable logic controller (PLC) or a distributed control system, that receives or sends input and output signals to and from components of the wet oxidation system. Communication networks may permit any sensor or signal-generating device to be located at a significant distance from the controller 70 or an associated computer system, while still providing data therebetween. Such communication mechanisms may be effected by utilizing any suitable technique including but not limited to those utilizing wireless protocols.

As discussed above with respect to typical operation of the oxidation unit, a liquid effluent is separated from the oxidized aqueous mixture downstream of the oxidation reactor. In some embodiments, the catalyst may be recovered from the liquid effluent by a separation process. For example, in some embodiments the catalyst may be precipitated out of the effluent stream. In one embodiment, a crystallizer may be used to recover the catalyst. The catalyst may then be recycled back to the wet oxidation system.

According to one or more embodiments, the wet oxidized liquid effluent stream may be processed by a secondary treatment unit 80 connected downstream of the oxidation reactor vessel 24 to remove remaining undesirable constituents present and/or polish when necessitated or desired. The secondary treatment unit 80 may be a chemical scrubber, a biological scrubber, an adsorption media bed, or other unit operation. In some embodiments, an advanced oxidation step including oxidation treatment of the wet oxidation effluent with ozone and ultraviolet light may be performed. Such advanced oxidation treatment is typically carried out in a vessel or tank at or near ambient temperature and pressure. The secondary treatment unit 80 may be sized to provide a surface area consistent with the desired degree of polishing. Alternatively, the liquid effluent may also be recycled back to reactor vessel 24 for further processing. Treatment of the off gas may also be required in a downstream off gas treatment unit depending on its composition and the requirements for discharge to the atmosphere.

Sensors to detect a concentration of a targeted odorous constituent may be provided upstream and/or downstream of the wet oxidation unit 24 to facilitate system control. For example, a sensor may be positioned at conduit 26 and be in communication with controller 70 to determine and/or control whether the liquid effluent stream should be diverted to the secondary treatment unit 80 to meet established environmental regulations.

It should be appreciated that numerous alterations, modifications and improvements may be made to the illustrated systems and methods. For example, one or more wet oxidation systems may be connected to multiple sources of process streams. In some embodiments, the wet oxidation system may include additional sensors for measuring other properties or operating conditions of the system. For example, the system may include sensors for temperature, pressure drop, and flow rate at different points to facilitate system monitoring. In accordance with one or more embodiments, the catalyst may be replenished during the wet oxidation process.

The invention contemplates the modification of existing facilities to retrofit one or more systems or components in order to implement the techniques of the invention. An existing wet oxidation system can be modified in accordance with one or more embodiments exemplarily discussed herein utilizing at least some of the preexisting equipment. For example, one or more pH sensors may be provided and a controller in accordance with one or more embodiments presented herein may be implemented in a preexisting wet oxidation system to promote catalyst solubility.

The function and advantages of these and other embodiments of the present invention will be more fully understood from the following examples. These examples are intended to be illustrative in nature and are not considered to be limiting the scope of the invention. In the following examples, compounds are treated by wet oxidation to affect destruction of bonds therein.

EXAMPLES

Bench Scale Wet Oxidation (Autoclave) Reactors

In the following Examples, bench scale wet oxidation tests were performed in laboratory autoclaves. The autoclaves differ from the full scale system in that they are batch reactors, where the full scale unit may be a continuous flow reactor. The autoclaves typically operate at a higher pressure than the full scale unit, as a high charge of air must be added to the autoclave in order to provide sufficient oxygen for the duration of the reaction. The results of the autoclave tests provide an indication of the performance of the wet oxidation technology and are useful for screening operating conditions for the wet oxidation process.

The autoclaves used were fabricated from titanium, alloy 600 and Nickel 200. The selection of the autoclave material of construction was based on the composition of the wastewater feed material. The autoclaves selected for use, each have total capacities of 500 or 750 ml.

The autoclaves were charged with wastewater and sufficient compressed air to provide excess residual oxygen following the oxidation (ca. 5%). The charged autoclaves were placed in a heater/shaker mechanism, heated to the desired temperature (280° C. to 350° C.) and held at temperature for the desired time, ranging from about 60 minutes to about 360 minutes.

During the heating and reacting periods, the autoclave temperature and pressure were monitored by a computer controlled data acquisition system. Immediately following oxidation, the autoclaves were removed from the heater/shaker mechanism and cooled to room temperature using tap water. After cooling, the pressure and volume of the off gas in the autoclave head-space were measured. A sample of the off-gas was analyzed for permanent gases. Subsequent to the analysis of the off gas, the autoclave was depressurized and opened. The oxidized effluent was removed from the autoclave and placed into a storage container. A portion of the effluent was submitted for analysis and the remaining sample was used for post-oxidative treatment. In order to generate sufficient volume for analytical work and post-oxidation test work, multiple autoclave tests for each condition were run.

Example 1

Wet Oxidation Process Utilizing a Homogeneous Copper Catalyst

Bench scale wet oxidation tests were performed at 280° C. with a 60 minute time at temperature to determine the impact of a copper catalyst on the oxidation of acetic acid at various pH levels (pH=2.2, 8.1, 11.5, 12.5 and 13.5). The data is presented below in Table 1.

TABLE 1

Results from wet oxidation (WO) of an acetic acid solution using copper catalyst.

| | | 10 g/L Acetic | Wet oxidation at 280° C.-60 minutes | | | | |
|---|---|---|---|---|---|---|---|
| | | Acid Feed | Effluent pH = 2.2 | Effluent pH = 8.1 | Effluent pH = 11.5 | Effluent pH = 12.5 | Effluent pH = 13.5 |
| Charge Conditions | | | | | | | |
| Autoclave Material | — | — | — | Ti | Ti | Ni 200 | Ni 200 | INC 600 |
| Autoclave Volume | ml | — | — | 500 | 500 | 500 | 500 | 750 |

TABLE 1-continued

Results from wet oxidation (WO) of an acetic acid solution using copper catalyst.

| | | | 10 g/L Acetic Acid Feed | Wet oxidation at 280° C.-60 minutes | | | | |
|---|---|---|---|---|---|---|---|---|
| | | | | Effluent pH = 2.2 | Effluent pH = 8.1 | Effluent pH = 11.5 | Effluent pH = 12.5 | Effluent pH = 13.5 |
| Charged Copper Concentration | g/L | Cu | — | 1 | 1 | 1 | 1 | 0.5 |
| NaOH Charged | g/L | NaOH | — | 0 | 7 | 1.2 | 1.6 | 20 |
| Air Charged | psig | — | — | 310 | 200 | 200 | 200 | 260 |
| Oxidation Temperature | ° C. | — | — | 280 | 280 | 280 | 280 | 280 |
| Time at Temperature | min | — | — | 60 | 60 | 60 | 60 | 60 |
| Analysis Results | | Reported as | | | | | | |
| M. COD | mg/L | O2 | 10100 | 356 | 7300 | 7300 | 6960 | 1180 |
| % COD Destruction | — | — | — | 96.5 | 27.7 | 27.7 | 31.1 | 90 |
| TOC | mg/L | C | 3950 | 141 | 2790 | 2790 | 2750 | 485.0 |
| % TOC Destruction | — | — | — | 96.4 | 29.4 | 29.4 | 30.4 | 88.1 |
| Soluble Copper | mg/L | Cu | — | 633 | 1.04 | <0.1 | 0.18 | 84.5 |
| pH | — | — | — | 2.20 | 8.13 | 11.46 | 12.50 | 13.5 |
| Organic Acids | | | | | | | | |
| Acetic Acid | mg/L | CH3COOH | 10050 | 222 | 8390 | 7270 | 6480 | 1260 |
| % Acetic Acid Destruction | % | — | — | 97.8 | 16.5 | 27.7 | 35.5 | 87.5 |

The copper catalyst exhibited the highest solubility at pH levels of 2.2 and 13.5. When the pH of the oxidized effluent was 2.2 and 13.5, about 98% and 88% acetic acid destruction was achieved, respectively. This also corresponded to the highest percentages of COD destruction (96.5%, 90%) and TOC destruction (96.4%, 88.1%). In contrast, when the pH of the solution was maintained in the pH range where copper was not soluble (pH=8.1, 11.5 and 12.5) only about 17% to 37% acetic acid destruction was achieved. When the copper was not soluble, lower percentages of COD destruction and TOC destruction were observed as well. The data indicated that copper solubility substantially increased the oxidation of acetic acid.

Example 2

Wet Oxidation Process Utilizing a Homogeneous Vanadium Catalyst

Bench scale wet oxidation tests were performed on a water solution containing acetic acid using vanadium as a homogeneous catalyst at two different pH levels. The results are presented in Table 2 below.

TABLE 2

Results from wet oxidation of an acetic acid solution using a vanadium catalyst.

| | | | 10 g/L Acetic Acid Feed for V Runs | Without Catalyst WO at 280° C., 60 min., pH = 2.7 | With Catalyst WO at 280° C., 60 min., pH = 2.7 | Without Catalyst WO at 280° C., 60 min., pH = 6.5 | With Catalyst WO at 280° C., 60 min., pH = 5.3 |
|---|---|---|---|---|---|---|---|
| Lims Book Ref | | | 197268 2790-26-1 | 188294 2751-88-1 | 197271 2790-29-1 | 188420 2751-91-1 | 197272 2790-30-1 |
| Charge Conditions | | | | | | | |
| Autoclave Material | — | — | — | Ti | Ti | Ti | Ti |
| Autoclave Volume | ml | — | — | 500 | 500 | 500 | 500 |
| Volume of Liquid Charged | ml | — | — | 150 | 150 | 150 | 150 |

TABLE 2-continued

Results from wet oxidation of an acetic acid solution using a vanadium catalyst.

| | | | 10 g/L Acetic Acid Feed for V Runs | Without Catalyst WO at 280° C., 60 min., pH = 2.7 | With Catalyst WO at 280° C., 60 min., pH = 2.7 | Without Catalyst WO at 280° C., 60 min., pH = 6.5 | With Catalyst WO at 280° C., 60 min., pH = 5.3 |
|---|---|---|---|---|---|---|---|
| Vanadium Concentration | mg/L | V | — | 0 | 5000 | 0 | 5000 |
| NaOH Charged | g/L | NaOH | — | 0 | 0 | 6.8 | 6.8 |
| Air Charged | psig | — | — | 300 | 300 | 300 | 300 |
| Oxidation Temperature | ° C. | — | — | 280 | 280 | 280 | 280 |
| Time at Temperature | min | — | — | 60 | 60 | 60 | 60 |
| Analysis Results | | Reported as | | | | | |
| TOC | mg/L | C | 3741 | 3710 | 3330 | 3790 | 3093 |
| % TOC Destruction | — | — | — | 2 | 11.0 | 5.3 | 17.3 |
| pH | — | — | — | 2.6 | 2.66 | 6.50 | 5.29 |

Under oxidative conditions, vanadium is soluble at pH levels greater than about 4.5. The results show that when the pH of the solution was 2.6, and the vanadium was mostly insoluble, only 2% destruction of TOC was achieved. A low percentage of TOC destruction was associated with a pH level of 2.66 as well. When the pH of the solution was increased to 5.3 (solubilizing the vanadium), while maintaining the same catalyst dosage, temperature, and time at temperature the destruction of TOC was increased to 17.3%. By increasing the pH of the solution from 2.66 to 5.3, there was about a 64% increase in the destruction of total organic carbon. The data indicated that vanadium solubility substantially increased the oxidation of acetic acid.

Example 3

Wet Oxidation Process Utilizing a Homogeneous Iron Catalyst

Bench scale wet oxidation tests were performed at 230° C. for 150 minutes on an oxalic acid solution at two different pH levels. The data is presented in Table 3 below.

TABLE 3

Results from wet oxidation of an oxalic acid solution using an iron catalyst.

| | Units | Reported As | Feed 18 g/L Oxalate | High pH, no catalyst | High pH, Fe Catalyst | Low pH, no catalyst | Low pH, Fe Catalyst |
|---|---|---|---|---|---|---|---|
| Charge Conditions | | | | | | | |
| Autoclave Material | — | — | — | Inc 600 | Inc 600 | Ti | Ti |
| Autoclave Volume | ml | — | — | 750 | 750 | 500 | 500 |
| Volume of Liquid Charged | ml | — | — | 250 | 250 | 200 | 200 |
| Air Charged | psig | — | — | 520 | 520 | 440 | 440 |
| Oxidation Temperature | ° C. | — | — | 150 | 150 | 150 | 150 |
| Time at Temperature | min | — | — | 150 | 150 | 150 | 150 |
| $Fe^{+2}$ added (as FeSO4) | g/L | Fe | — | — | 2.24 | — | 2.24 |
| Analysis Results | | | | | | | |
| TOC | mg/L | C | 5100 | 3650 | 3720 | 240.0 | <5.6 |
| TOC Destruction | % | — | — | 28.4 | 27.1 | 95.3 | 99.9 |
| DIC | mg/L | C | <20 | 955 | 912.0 | — | — |
| pH | — | — | — | 13.7 | 13.6 | 2.6 | 1.7 |

Under oxidative conditions, iron is soluble below a pH level of about 4. The results indicated that there was no enhancement of oxidation when an iron catalyst was used at a high pH level (pH=13.6 and 13.7) where it was insoluble. When the pH of the solution was in the range where the iron was soluble (pH=2.6 and 1.7), the destruction of oxalic acid was increased to about 95% and about 100%, respectively. The data indicated that iron solubility substantially increased the oxidation of oxalic acid.

Example 4

Wet Oxidation of Chlorophenol Utilizing a Homogeneous Iron Catalyst

Both iron catalyzed and non-catalyzed oxidations of chlorophenol were performed at 150° C. with a 90 minute time at temperature. The data is tabulated below in Table 4.

TABLE 4

Results from wet oxidation of chlorophenol using an iron catalyst.

| | | | WO of Chlorophenol (1.24 g/L) | | |
|---|---|---|---|---|---|
| | Units | Reported as | Feed | No Catalyst | Fe Catalyst |
| LIMS Book Ref | | | 182594 2751-51-1 | 182595 2751-82-1 | 182596 2751-83-1 |
| Charge Conditions | | | | | |
| Autoclave Material | — | — | — | Ti | Ti |
| Autoclave Volume | ml | — | — | 500 | 500 |
| Volume of Liquid Charged | ml | — | — | 200 | 200 |
| Air Charged | psig | — | — | 200 | 200 |
| Oxidation Temperature | ° C. | — | — | 150 | 150 |
| Time at Temperature | min | — | — | 90 | 90 |
| Fe Catalyst added | g/L | FeSO47H2O | — | — | .05 |
| Analysis Results | | | | | |
| M. COD | mg/L | O2 | 2040 | 1890 | 650 |
| COD Destruction | % | — | — | 7.4 | 68.1 |
| TOC | mg/L | C | 667 | 620 | 284 |
| TOC Destruction | % | — | — | 7.0 | 57 |
| Sol Fe | mg/L | Fe | — | — | 48 |
| pH | — | — | 5.4 | 2.90 | 2.30 |

These tests showed that increasing the solubility of the iron catalyst, by lowering the pH level from 2.9 to 2.3, resulted in increasing TOC destruction from about 7% to about 57%. Likewise, lowering the pH level increased COD destruction from about 7.4% to about 68.1%. The data indicated that even slight adjustment of pH level significantly increases the efficiency of a catalytic wet oxidation process.

Example 5

Wet Oxidation Process Utilizing a Homogeneous Copper Catalyst

Bench scale wet oxidation tests were performed at 280° C. with a 60 minute time at temperature to determine the impact of a copper catalyst on the oxidation of acetic acid at various pH levels (pH=2.2, 2.9, 4.3, 4.7, 8.1, and 11.5). The data is presented below in Table 5.

TABLE 5

Results from wet oxidation (WO) of an acetic acid solution using copper catalyst.

| | Acetic Acid | Wet oxidation at 280° C.-60 minutes | | | | | |
|---|---|---|---|---|---|---|---|
| | (10 g/L) Feed | Effluent pH = 2.2 | Effluent pH = 2.9 | Effluent pH = 4.3 | Effluent pH = 4.7 | Effluent pH = 8.1 | Effluent pH = 11.5 |
| Charge Conditions | | | | | | | |
| Autoclave Material | | Ti | Ti | Ti | Ti | Ti | Ni |
| Autoclave Volume (ml) | | 500 | 500 | 500 | 500 | 500 | 500 |
| Volume of Liquid (ml) | | 100 | 100 | 100 | 100 | 100 | 100 |
| Total Copper Charged (mg/L) | | 1000 | 1000 | 1000 | 1000 | 1000 | 1000 |
| Sodium Hydroxide Charged (mg/L) | | 0 | 1 | 3 | 4 | 7 | 12 |
| Air Charged (psi) | | 200 | 200 | 200 | 200 | 200 | 200 |
| Oxidation Temperature (° C.) | | 280 | 280 | 280 | 280 | 280 | 280 |
| Time At Temp (min) | | 60 | 60 | 60 | 60 | 60 | 60 |

TABLE 5-continued

Results from wet oxidation (WO) of an acetic acid solution using copper catalyst.

| | Acetic Acid (10 g/L) Feed | Wet oxidation at 280° C.-60 minutes | | | | | |
|---|---|---|---|---|---|---|---|
| | | Effluent pH = 2.2 | Effluent pH = 2.9 | Effluent pH = 4.3 | Effluent pH = 4.7 | Effluent pH = 8.1 | Effluent pH = 11.5 |
| Analysis Results | | | | | | | |
| M. COD (mg/L) | 10100 | 360 | 5830 | 6360 | 7710 | 7300 | 7300 |
| % COD Destruction | | 96.4 | 42.3 | 37.0 | 23.7 | 27.7 | 27.7 |
| Soluble Copper (mg/L) | | 630 | 100 | 26 | 14 | 1 | <0.1 |
| % Copper Dissolved | | 63.0 | 10.0 | 2.6 | 1.4 | 0.1 | 0 |

The results indicated that in general, the solubility of the copper catalyst decreased with increasing pH. Further, the degree of acetic acid destruction also decreased with increasing pH. This data further confirms the conclusions drawn from Example 1; mainly that copper solubility substantially increased the oxidation of acetic acid. As shown by this example, the oxidation process is enhanced by the presence of the copper catalyst under a wide range of pH values.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the systems and techniques of the invention are used. Those skilled in the art should also recognize, or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

What is claimed is:

1. A catalytic wet oxidation process, comprising:
providing an aqueous mixture containing at least one undesirable constituent to be treated;
detecting a pH level of the aqueous mixture containing at least one undesirable constituent to be treated;
selecting a catalyst soluble at the detected pH level of the aqueous mixture, wherein the catalyst and the detected pH level are selected from the group consisting of: copper at a pH level of about 4 or lower, copper at a pH level above about 13, vanadium at a pH level above about 4.5, and iron at a pH level below about 4;
contacting the aqueous mixture containing at least one undesirable constituent to be treated with the selected catalyst soluble at the detected pH level and an oxidizing agent at an elevated temperature and a superatmospheric pressure to treat the at least one undesirable constituent;
monitoring the pH level of the aqueous mixture; and
maintaining the pH level of the aqueous mixture to maintain the catalyst in a soluble form during the catalytic wet oxidation process.

2. The process according to claim 1, wherein contacting the aqueous mixture with the selected catalyst occurs prior to heating.

3. The process according to claim 1, wherein contacting the aqueous mixture with the selected catalyst occurs prior to pressurization.

4. The process according to claim 1, wherein the aqueous mixture is oxidized in a continuous process.

5. The process according to claim 1, further comprising replenishing the catalyst.

6. The process according to claim 1, wherein contacting the aqueous mixture with an oxidizing agent comprises contacting the aqueous mixture with an oxygen-containing gas.

7. The process according to claim 1, further comprising recovering the catalyst.

8. The process according to claim 7, wherein recovering the catalyst involves precipitating the catalyst.

9. The process according to claim 1, wherein the aqueous mixture is oxidized for a period of time sufficient to treat the at least one undesirable constituent.

10. The process according to claim 1, wherein the superatmospheric pressure is from about 30 atmospheres to about 275 atmospheres.

11. The process according to claim 1, wherein the elevated temperature is from about 240° C. to about the critical temperature of water.

12. The process according to claim 1, wherein the elevated temperature is above the critical temperature of water.

13. A catalytic wet oxidation process, comprising:
providing an aqueous mixture containing at least one undesirable constituent to be treated;
selecting a catalyst;
detecting a pH level of the aqueous mixture containing at least one undesirable constituent to be treated;
adjusting the pH level of the aqueous mixture containing at least one undesirable constituent to be treated to solubilize the selected catalyst, the pH level selected from the group consisting of: about 4 or lower when the catalyst comprises copper, above about 13 when the catalyst comprises copper, above about 4.5 when the catalyst comprises vanadium, and below about 4 when the catalyst comprises iron;

contacting the aqueous mixture with the selected catalyst and an oxidizing agent at an elevated temperature and a superatmospheric pressure to treat the at least one undesirable constituent;

monitoring the pH level of the aqueous mixture; and maintaining the pH level of the aqueous mixture to maintain the selected catalyst in a soluble form during the catalytic wet oxidation process.

14. The process according to claim 13, wherein the aqueous mixture is oxidized for a period of time sufficient to treat the at least one undesirable constituent.

15. The process according to claim 13, wherein the superatmospheric pressure is from about 30 atmospheres to about 275 atmospheres.

16. The process according to claim 13, wherein the elevated temperature is from about 240° C. to about the critical temperature of water.

17. The process according to claim 13, wherein the elevated temperature is above the critical temperature of water.

18. The process according to claim 13, further comprising replenishing the catalyst.

19. The process according to claim 13, wherein selecting the catalyst comprises selecting a catalyst present in the aqueous mixture.

20. The process according to claim 13, further comprising recovering the catalyst.

\* \* \* \* \*